United States Patent [19]
Hattori et al.

[11] Patent Number: 5,366,674
[45] Date of Patent: Nov. 22, 1994

[54] PROCESS FOR PRODUCING EXPANDED PLASTICS WITH SKIN

[75] Inventors: Kazuhide Hattori; Hiroyuki Yamaji, both of Mie; Yoshikazu Hatakeyama; Yoshiyuki Shida, both of Niigata; Atushi Tamura, Tokyo; Takumi Kitaoka, Tokyo; Takashi Kohama, Tokyo, all of Japan

[73] Assignees: Aronkasei Co., Ltd., Osaka; Mitsubishi Yuka Badische Co., Ltd., Yokkaichi; Sanko Sogyo Co., Ltd., Sanjo, all of Japan

[21] Appl. No.: 37,982

[22] Filed: Mar. 26, 1993

[30] Foreign Application Priority Data

| Jul. 13, 1992 | [JP] | Japan | 4-209761 |
| Jul. 13, 1992 | [JP] | Japan | 4-209762 |
| Jul. 13, 1992 | [JP] | Japan | 4-209763 |
| Jul. 17, 1992 | [JP] | Japan | 4-213582 |
| Jul. 17, 1992 | [JP] | Japan | 4-213583 |

[51] Int. Cl.$^5$ .................................. B29C 67/22
[52] U.S. Cl. .................................. 264/45.4; 264/466; 264/102; 264/572
[58] Field of Search .................. 264/45.4, 46.8, 46.6, 264/572, 102, 571, 573; 425/812

[56] References Cited

U.S. PATENT DOCUMENTS

| 3,619,436 | 11/1971 | Gruss et al. | 264/45.4 |
| 3,801,244 | 4/1974 | Eisenberg | 264/45.4 |
| 4,115,491 | 9/1978 | Hanning | 264/45.1 |
| 4,144,296 | 3/1979 | Dickens | 264/45.4 |
| 4,546,899 | 10/1985 | Williams | 264/46.6 |
| 4,990,083 | 2/1991 | Bernhardt | 264/572 |

Primary Examiner—Allan R. Kuhns
Attorney, Agent, or Firm—Oblon, Spivak, McClelland, Maier & Neustadt

[57] ABSTRACT

A process for producing expanded plastic with a skin and a molding apparatus therefor, the process including blowing a parison being held in a closed blow mold to obtain a hollow article, filling the hollow article with thermoplastic preexpanded resin beads before the hollow article is cooled to solidify, heating and fusing said beads, and cooling the expanded plastic. A hollow article and an expanded body are completely fused together, and improved productivity is obtained.

10 Claims, 5 Drawing Sheets

PROCESS FOR PRODUCING EXPANDED PLASTICS WITH SKIN

FIELD OF THE INVENTION

This invention relates to a process for producing expanded plastics with a skin and an apparatus for carrying out the process.

BACKGROUND OF THE INVENTION

As is well known, expanded plastics are widely used as heat insulating materials, sound absorbing materials, floats, etc. Among known molding processes for obtaining expanded plastics is a foaming-in-mold method, in which preexpanded resin beads are put in a foaming mold, and heating steam is blown into the mold to heat and fuse the resin beads (see, for example, JP-B-3-56905, the term "JP-B" as used herein means an "examined published Japanese patent application").

Thermoplastic resin expanded plastics with a skin obtained by, for example, filling preexpanded resin beads in a hollow non-foam molded article and expanding the beads is known (see, for example, JP-B-42-10752). Appearance of expanded plastic with a skin has enlarged the uses of expanded plastics.

The expanded plastics with a skin has conventionally been produced by blowing a non-foaming parison in a blow mold, cooling and solidifying the blown parison to form a hollow article, removing the hollow article from the blow mold, filling the hollow article with preexpanded resin beads (hereinafter sometimes referred to as expanded beads), blowing heating steam from a steam injection pipe inserted among the filled beads to heat and further expand the expanded beads, and withdrawing the pipe before fusion of the expanded beads (see JP-B-62-19239 and JP-B-U-62-9073, the term "JP-B-U" as used herein means an "examined published Japanese utility model application").

According to the above-mentioned process, there are several problems. As the hollow article (skin) and the expanded plastic body are separately molded, separate molds are required and the process is complicated. Besides, the time for cooling to solidify the hollow article and that for heating and fusion of expanded beads and for cooling the expanded plastic body are independently required, resulting in poor productivity. In addition, since the expanded beads are molded in a once cooled hollow article, fusion of the expanded plastics to the hollow article tends to be insufficient.

In order to overcome these problems, it has been proposed to inject a reactive foaming liquid (e.g., urethane) into a parison being held in a closed blow mold, to blow the parison to the inner wall of the mold and then cool and solidify the blown parison with the mold closed while allowing the foaming liquid to react and solidify to obtain foam with a skin (see JP-B-58-10217 and JP-A-3-293113, the term "JP-A" as used herein means an "unexamined published Japanese patent application").

However, according to the above-mentioned process, since blowing of the parison to the mold wall is effected by the foaming pressure of the foaming material, the blowing pressure is liable to be insufficient, failing to bring the parison into close contact with the inner wall, especially of the mold of complicated shape, and to uniformly inflate the parison.

JP-A-59-145125 proposes a process for producing expanded plastic with a skin comprising delivering a heated parison into a blow mold, closing the mold, blowing pressurized air from a pipe having been inserted in the parison for blow molding while feeding preexpanded beads with air into the parison, expanding the expanded beads by the heat of the parison, withdrawing the pipe, and cooling the article.

However, since the above process utilizes the heat of the parison for expanding of preexpanded beads, the heat is not sufficiently transmitted to the central portion of the expanded plastic body, resulting in the failure of uniform expanding and fusion, which leads to a reduction in expanded plastic quality.

SUMMARY OF THE INVENTION

An object of the present invention is to provide a process for producing expanded plastic with a skin in which preexpanded beads are uniformly expanded and fused and an expanded body composed of those expanded beads is completely fused to the skin while achieving improved productivity.

Another object of the present invention is to provide a simplified molding apparatus for efficiently carrying out the process.

The present invention provides a process for producing expanded plastic with a skin comprising blowing a parison being held in a closed blow mold to obtain a hollow article, filling the hollow article with thermoplastic preexpanded resin beads before the hollow article is cooled to solidify, heating and fusing said beads, and cooling the expanded plastic.

Where blow molding and expansion molding are conducted in the same mold as in the process of the present invention, complexity of the attachment device gives rise to a problem, which tends to cause an increase in molding cycle especially in the production of large-sized articles.

In order to solve this problem, the present invention also provides a molding apparatus for producing expanded plastic with a skin which is composed of a split-cavity mold for blow molding, at least one pipe which can be inserted into the mold cavity and be withdrawn therefrom, and a feeder of preexpanded resin beads which can be inserted into the mold cavity and be withdrawn therefrom, said pipe(s) being connected to a blowing air source and a heating steam source via the respective valve.

DETAILED DESCRIPTION OF THE INVENTION

Figure 1:
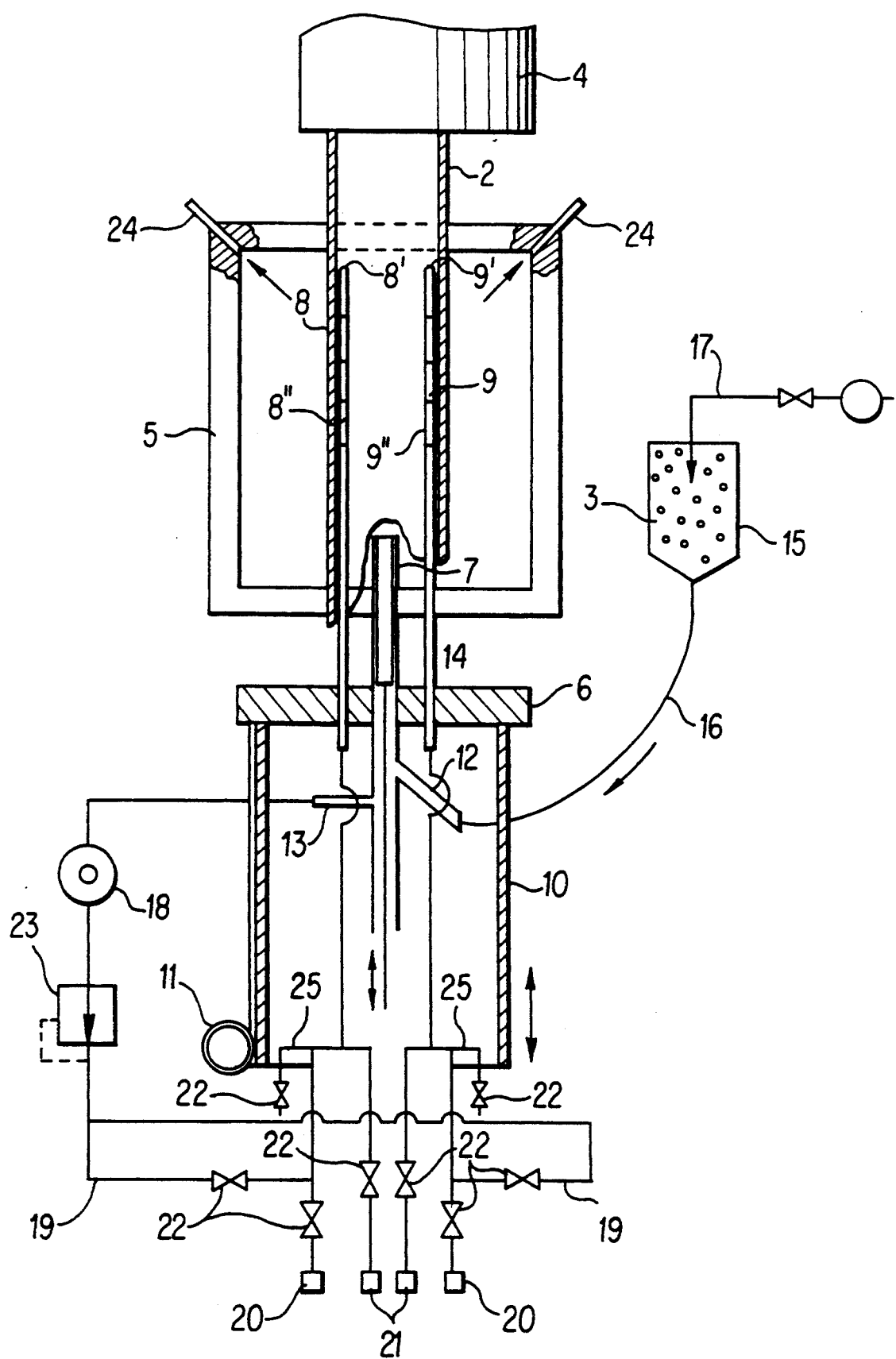
FIG. 1 is a cross section of a molding apparatus which can be used in the present invention along the parting line of a split-cavity mold.
Figure 2:
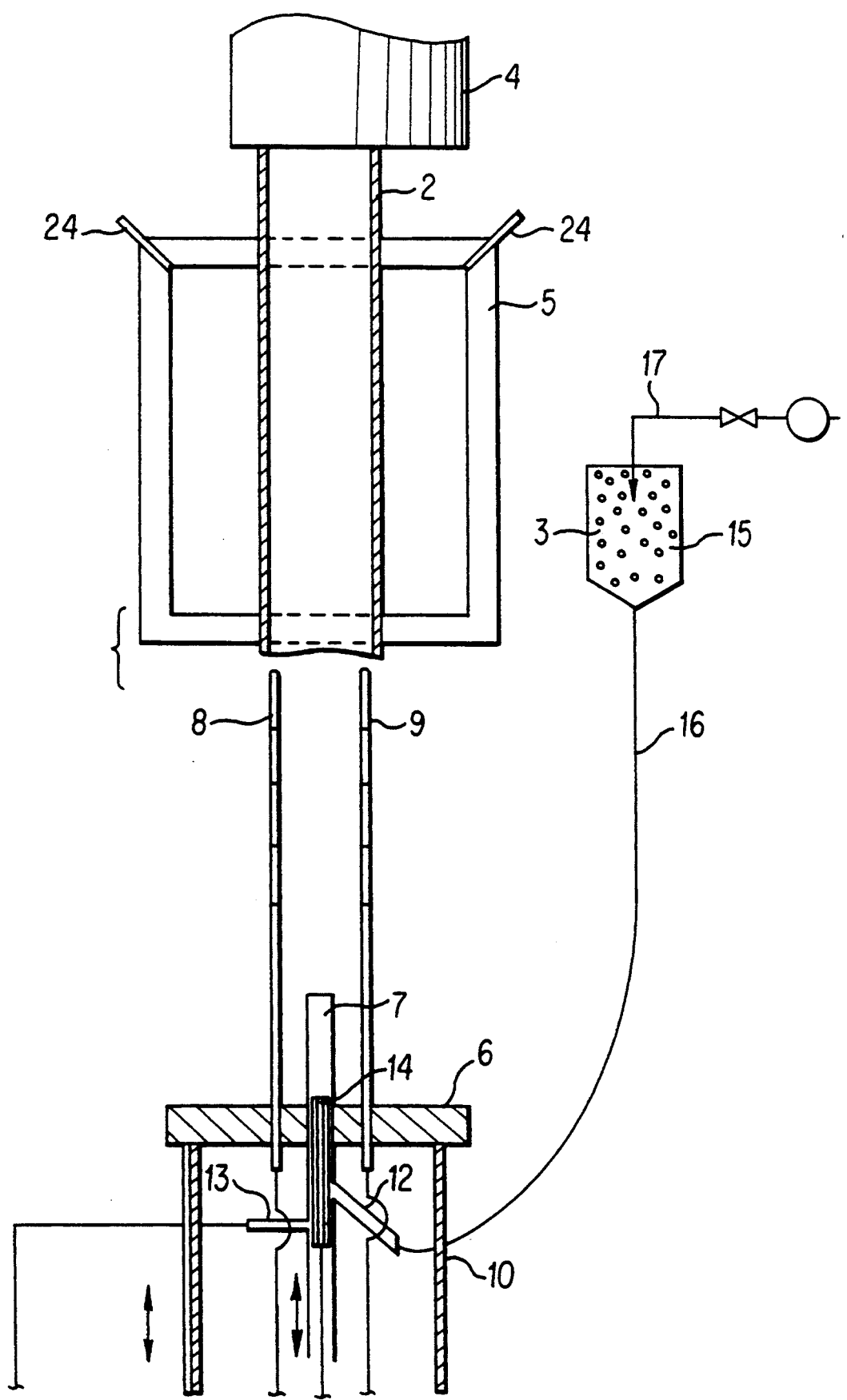
FIGS. 2, 3, and 4 is each a cross section illustrating the process of the present invention, carried out by using the molding apparatus of FIG. 1.
Figure 3:
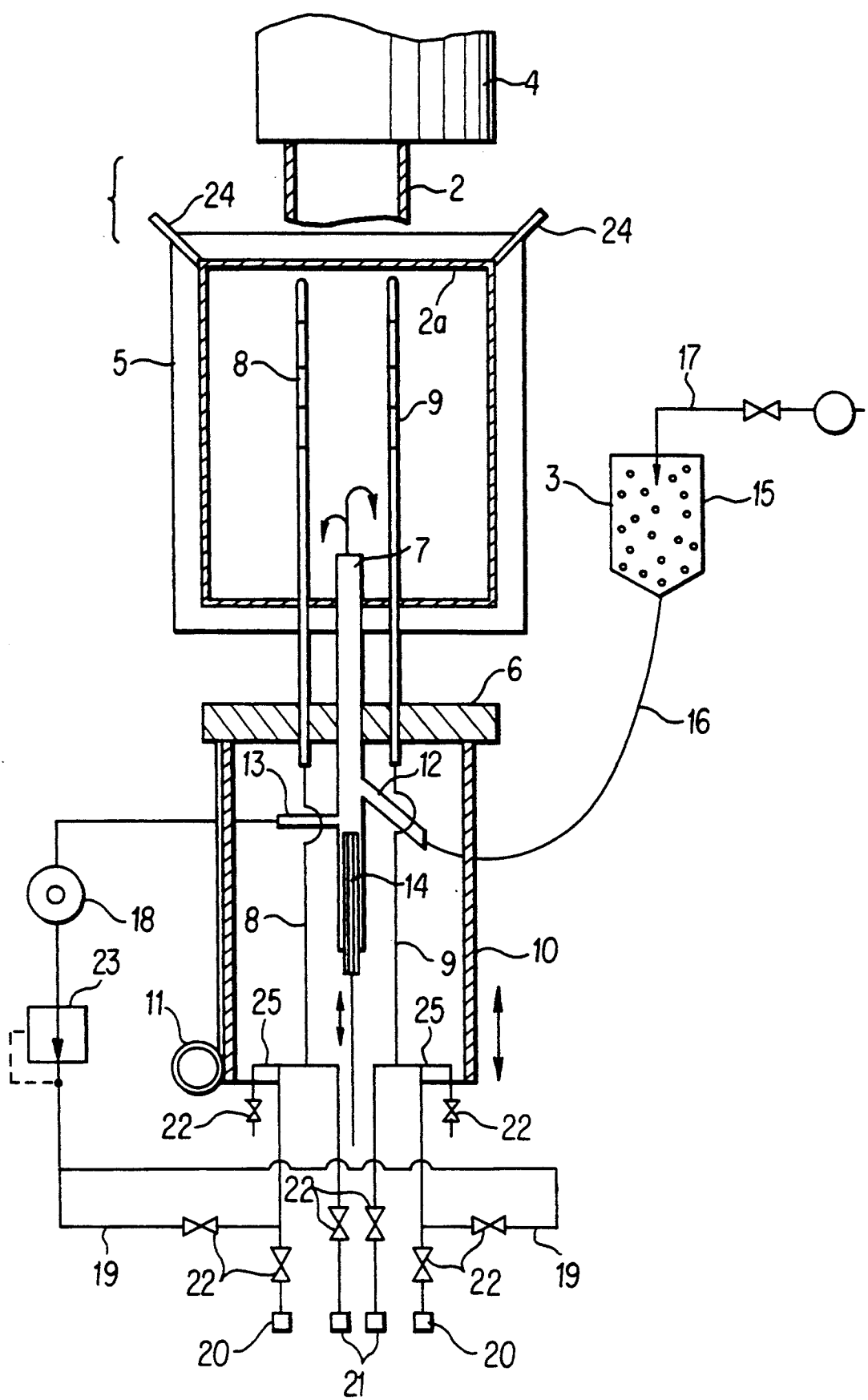

The molding apparatus which can be used in the present invention is explained below by referring to the attached drawings.

In FIGS. 1 through 5, 5 is a blow mold, and they each illustrates a cross section of a molding apparatus alone the parting line of blow mold 5 (one of splits with removing the other split from blow mold composed of a pair of splits). 4 is a parison extruder set above blow mold 5. Parison extruder 4 can heat and melt a desired resin and deliver parison 2 to blow mold 5. Parison extruder 4 may be replaced with any other parison feeder, for example, an injection unit with which an increased rate of parison delivery is obtained.

Below blow mold 5 are set pipes 8, 9 and feeder 7 which can be inserted into the cavity of blow mold 5 through guide groove 8a, 9a, and 7a provided on the parting line. The bottom ends of pipes 8, 9 and feeder 7 are fixed to vertically movable mount 6 with feeder 7 being centered. Mount 6 is vertically moved by elevating mechanism 11 provided at leg 10 so that pipes 8, 9 and feeder 7 may be inserted into the cavity of blow mold 5 and be withdrawn therefrom. Elevating mechanism 11 includes a rack-and-pinion, a servomotor, and a pneumatic or hydraulic cylinder elevator.

Pipes 8 and 9 are longer than feeder 7 so that, when mount 6 moves forward, pipes 8 and 9 insert the cavity of blow mold 5 to a certain depth and uniformly blow air while feeder 7 is on the same or approximately the same level of the inner wall of blow mold 5 or slightly projects into the cavity of blow mold 5.

While the apparatus shown in FIGS. 1 to 4 has two pipes 8 and 9, a single pipe will do, or more than two pipes may be provided for the production of large-sized molded articles.

Pipe 8 or 9 includes an open-ended pipe, and perforated pipe having a plurality of ports or slits 8", 9" on the side wall thereof, and a perforated pipe with closed top 8', 9' having a plurality of ports or slits 8", 9" on the side wall thereof. The diameter of the open tip and the ports or slits on the side wall is smaller than that of expanded beads 3. These pipes may be telescopic pipes which can adjust the vertical position of the ports or slits on the side wall thereof.

Both pipes 8 and 9 are connected to air source 18 (through blowing air pipe 19 and reducing pressure valve 23), heating steam source 20 and vacuum extractor 21, and drain pipe 25, via the respective valves 22, to perform combined functions of blowing of air for blow molding, opening the inside of a hollow article to the atmosphere or drawing the inside of a hollow article before and/or during feeding of expanded beads 3, supplying of heating steam to expanded beads 3, evacuating or drawing during the supply of heating steam (hereinafter described), and drawing during cooling. Separate pipes may be provided to perform the respective functions.

Feeder 7 has inlet 12 for introducing expanded beads 3, air injector 13, which is connected to air source 18, for filling blow mold 5 with expanded beads 3 through inlet 12 by pneumatic conveying and piston valve 14 for opening and closing inlet 12 and air injector 13. Inlet 12 is led to hopper 15 through flexible pipe 16, and the hopper 15 is equipped with pressurizing means 17 for effective feed of expanded beads 3.

24 at each upper corner of blow mold 5 is inserted pin having a smaller diameter than expanded beads 3.

Production of expanded plastic with a skin can be carried out using the above-mentioned molding apparatus as follows.

The thermoplastic resin is heated and melted in extruder 4 set above blow mold 5, for example, 180° to 220° C. for a polypropylene resin or 160° to 200° C. for a polyethylene resin, extruded parison 2, and delivered to open mold 5 set at 40° to 80° C. (see FIG. 2).

Before or after the parison delivery to mold 5, mount 6 is elevated to insert feeder 7 and pipes 8, 9 into parison 2. At the time when the parison delivery completes, mold 5 is closed to hold parison 2. Then, valves 22 of blowing air pipes 19, 19 are opened to blow air having a pressure of from 2 to 7 kg/cm$^2$G (gauge pressure) from air source 18 through reducing pressure valve 23 to pipes 8 and 9 into parison 2 for 10 to 20 seconds, whereby parison 2 is blown to form hollow article 2a.

Valves 22 of air pipes 19, 19 are then closed. Piston valve 14 is opened while hollow article 2a is allowed to cool, and air from air source 18 is fed to air injector 13 whereby expanded beads 3 from inlet 12 are fed to hollow article 2a (see FIG. 3).

Piston valve 14 is then closed. Valves 22 of heating steam sources 20, 20 are opened to blow heating steam having a pressure of from 0.1 to 1.2 kg/cm$^2$G, preferably from 0.8 to 1.0 kg/cm$^2$G, i.e., having a temperature of from 115° to 120° C. among filled expanded beads 3 for 2 to 20 seconds using pipes 8 and 9. As a result, preexpanded beads 3 are further expanded and fuse together to form an expanded plastic body with a skin on. The expanded plastic with a skin is then cooled.

Figure 4:
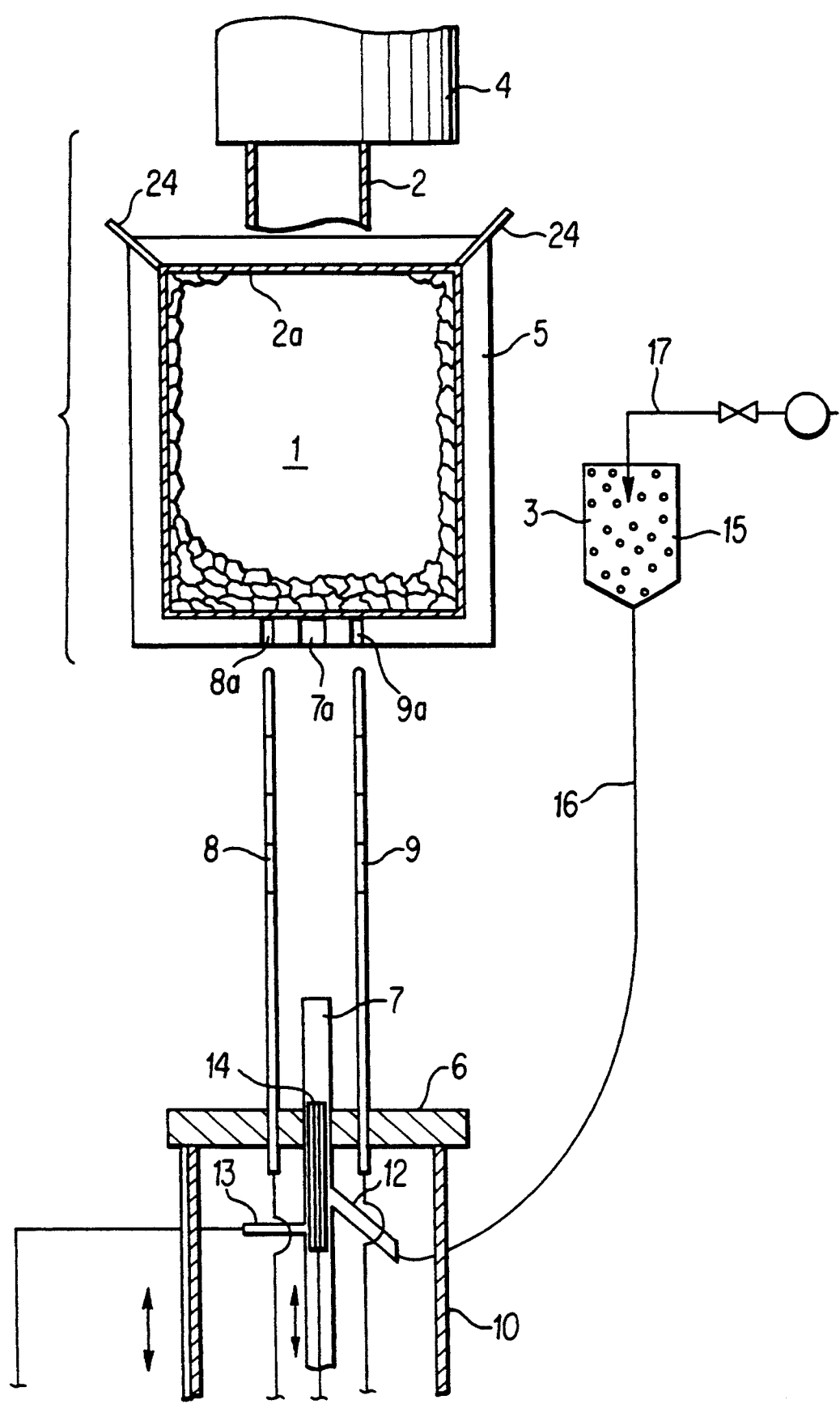

Finally, mount 6 is lowered to withdraw feeder 7 and pipes 8, 9, and blow mold 5 is opened to remove expanded plastics 1 with a skin from the mold (see FIG. 4).

Expanded plastic 1 with a skin thus obtained is composed of hollow article 2a comprising a polyolefin resin (e.g., polyethylene or polypropylene), a polystyrene resin, a polyvinyl chloride resin, an ABS resin, etc. and an expanded body comprising expanded and fused resin beads 3 having a diameter of from 1 to 3 nun, such as polystyrene beads or polyolefin beads (e.g., polyethylene or polypropylene). Preferably, the kind of the skin and the expanded beads is the same because of enhancing the fusing the skin and the expanded plastic to improve the strength of the expanded plastics with a skin.

In the case of using preexpanded polyolefin beads, it is recommended to compensate for shortage of foamability of the polyolefin beads by aging preexpanded resin beads in a pressure tank while applying air of a given pressure, e.g., 1 to 20 kg/cm$^2$G, preferably 5 to 10 kg/cm$^2$G, for a given period of time, e.g., 30 minutes to 60 hours, preferably 3 to 12 hours before feeding them to the blow mold, to increase the inner pressure of the preexpanded resin beads.

According to above process, since the expanded beads are filled in a closed hollow article with no escape of the air used for pneumatic conveying, filling tends to be insufficient. In order to ensure sufficient filling of the beads into the hollow article, it is preferable to open the inside of hollow article 2a to the atmosphere before and during feed of expanded beads 3 into hollow article 2a by (i) opening valves 22 of drain pipes 25 and/or (ii) making holes in hollow article 2a with pins 24, 24. It is also preferable to draw the inside of hollow article 2a before and during feed of expanded beads 3 into hollow article 2a by (iii) opening valves 22 of vacuum extractors 21 and/or (iv) connecting pins 24 to drawing extractors and inserting pins 24 inside hollow article 2a. The degree of drawing preferably ranges from 300 to 760 mmHg, particularly from 600 to 760 mmHg.

Figure 5:
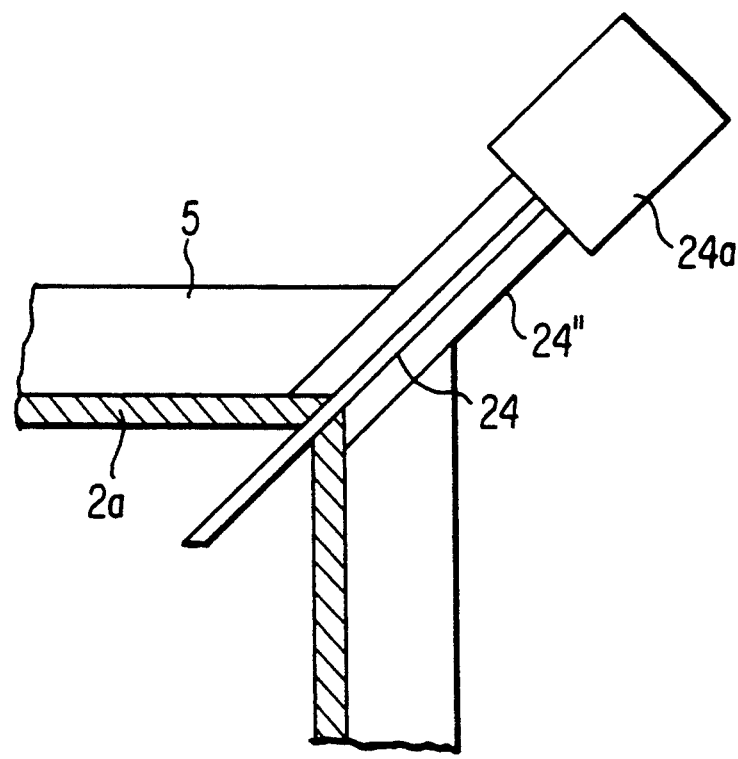
FIG. 5 is a partial cross section of another molding apparatus which can be used in the present invention.

To further improve filling efficiency, it is effective to apply pressure of from 0.5 to 3 kg/cm$^2$G, preferably from 0.8 to 1.2 kg/cm$^2$G, to hopper 15 by means of pressurizing means 17.

Where hollow article 2a is filled with expanded beads 3 while drawing the inside of the hollow article 2a, filling may be effected by suction of the reduced pressure without applying fluid pressure, such as air pressure, to the expanded beads.

Where the inside of the hollow article 2a is drawn, hollow article 2a is sometimes slightly dented inside depending on the degree of cooling or the size or shape of the hollow article. This being the case, it is recommended to draw hollow article 2a toward the mold wall by (i) drawing through evacuation ports usually provided on the mold wall (not shown in Figs.) or (ii) using double-structured pin connected to vacuum extractor 24a as shown in FIG. 5 which comprises inner pin 24' and outer pin 24", inner pin 24' being inserted inside the hollow article to draw the inside of the hollow article while the tip of outer pin 24" being positioned at the interface between hollow article 2a and blow mold 5 to draw the interface. The double-structured pin may be provided at not only the upper corners of blow mold 5 but other appropriate positions, preferably at the position facing to the filling direction of feeder 7.

For the purpose of enhancing fusion of expanded beads, a compression filling method in which compressed expanded beads are fed to a previously pressurized hollow article may be adopted. The compression filling method is particularly effective for polyolefin expanded beads.

Compression filling can be carried out by, for example, supplying air from air pipe 19 to hollow article 2a to a given inner pressure while adjusting the inner pressure by switching valve 22 connected to drain pipe 25. The inner pressure of hopper 15 is set slightly higher than that of hollow article 2a, for example, at 0.1 to 3 $kg/cm^2G$, preferably 0.1 to 1 $kg/cm^2G$, by means of pressurizing means 17 so as to make a pressure difference therebetween.

For the purpose of further enhancing heat fusion of expanded beads, it is effective to feed heating steam from one of pipes 8 and 9 while opening the other pipe to the atmosphere or drawing thereby to obtain a smooth flow of heating steam through expanded beads. Further, while depending on the shape of the expanded plastic with a skin, pipes 8 and 9 may be interchangeably connected to vacuum extractor 21 and heating steam source 20 at a given time interval.

Where a conventional mold cooling system is used in the molding process of the present invention, steam condensate tends to remain inside the expanded plastic body because the heating stream is confined in the hollow article giving no escape to the condensate, only to produce a molded article having poor strength. To avoid this, it is preferable to remove steam condensate and heat by drawing through pipes 8 and 9 by means of vacuum extractors 21, 21 and/or through pines 24 provided at the corners. This cooling process is in place of or in addition to the conventional cooling system. In this case, pipes of drawing may be provided at appropriate positions. The degree of drawing ranges generally from 200 to 760 mmHg, preferably from 600 to 760 mmHg.

In the molding process according to the present invention, the above-described embodiments of filling, heating, and cooling steps may be combined appropriately. In a particularly preferred combination, expanded beads 3 are fed to hollow article 2a open to the atmosphere while applying pressure to expanded beads by means of pressurizing means 17; heating is then carried out by feeding heating steam from one of two pipes 8 and 9 while drawing through the other pipe to thereby obtain a smooth flow of steam throughout expanded beads 3 with exchanging the pipe for heating and that for vacuum drawing; and blow mold 5 is cooled externally while drawing through pipes 8 and 9 by means of vacuum extractors 21 to remove condensate and the heat.

While the invention has been described with respect to an particular embodiment in which two pipes are inserted into a hollow article, each of which is connected to a blowing air source, a heating steam source, and a vacuum extractor via the respective valves, it is possible that one of the pipes is connected only to a blowing air source and a heating steam source with the other connected only to a blowing air source and a vacuum extractor. It is also possible that three pipes are employed, which are individually connected to a blowing air source, a heating steam source, or a vacuum extractor. From the standpoint of simplification of the whole equipment and the operation, reduction of initial cost of equipment, reduction of product cost, and possibility of mass production, it is preferable that at least one pipe is connected to both of a blowing air source and a heating steam source. It is more preferable that one pipe is connected to all of a blowing air source, a heating steam source, and a vacuum extractor via the respective valves.

According to the molding process of the present invention, expanded plastics with a skin can be obtained through one molding step in a single mold serving for blow molding and for in-mold-foaming thereby achieving simplification of a molding apparatus and reducing an initial cost, leading to a reduction in production cost.

According to the embodiment in which a closed hollow article is filled with expanded beads while being opened to the atmosphere or drawn, a high filling density can be attained while greatly shortening the whole molding cycle. Where the expanded beads are fed under pressure, the filling density can further be increased.

According to the embodiment in which heating is conducted by supplying heating steam from one pipe while evacuating from another pipe, the heating steam is made to flow smoothly through the expanded beads to cause the expanded beads to foam uniformly and to sufficiently fuse together. In addition, the molding cycle can be shortened.

According to the embodiment in which the expanded body is cooled while drawing the inside of the expanded plastic body, the residual steam condensate can be removed and cooling can be accelerated thereby to improve the quality of the product.

Where the molding apparatus of the present invention is used to carry out the process of the present invention, since expansion molding of preexpanded beads can be performed in the same mold as used for blow molding without removing a hollow article, the molding cycle is remarkably shortened. Further, steps of blowing, filling, heating, and cooling can be performed with a pipe or pipes interchangeably connected to a blowing air source and a heating steam source and, if desired, to a vacuum extractor via the respective valves. Therefore, drawing or evacuation for efficient filling of a hollow article with preexpanded beads can be carried out without adversely affecting the hollow article while being cooled. As a result, the whole equipment and the operation are simplified, the initial cost of equipment can be reduced, which leads to a reduction in product cost and favors mass production.

While the invention has been described in detail and with reference to specific examples thereof, it will be apparent to one skilled in the art that various changes and modifications can be made therein without departing from the spirit and scope thereof.

What is claimed is:

1. A process for producing expanded plastic with a skin comprising:
   1) blowing a parison held in a blow mold with compressed air to obtain a hollow article, said blow mold being equipped with
      one or more pipes capable of being inserted into and withdrawn from the mold and connected via valves to a blowing air source, a heating steam source and a vacuum extractor, and
      a feeder for supplying thermoplastic pre-expanded resin beads,
      said compressed air being introduced through said one or more pipes,
   2) filling the inside of the hollow article with thermoplastic pre-expanded resin beads by means of the feeder while the hollow article is still warm and within said blow mold,
   3) heat-fusing said beads with steam introduced through said one or more pipes to obtain an expanded article, and
   4) cooling the expanded article while drawing the inside of the expanded article via said one or more pipes with vacuum.

2. A process as claimed in claim 1, wherein said filling is conducted with the inside of the hollow article open to the atmosphere via said one or more pipes inserted into the hollow article.

3. A process as claimed in claim 2, wherein said filling is conducted with pressurized air.

4. A process as claimed in claim 2, wherein said heating is conducted by supplying heating steam from one of at least two pipes inserted into said hollow article while evacuating said hollow article through the other pipe.

5. A process as claimed in claim 1, wherein said filling is conducted while drawing the inside of the hollow article via said one or more pipes inserted into the hollow article.

6. A process as claimed in claim 5, wherein said filling is conducted with pressurized air.

7. A process as claimed in claim 5, wherein said heating is conducted by supplying heating steam from one of at least two pipes inserted into said hollow article while evacuating said hollow article through the other pipe.

8. A process as claimed in claim 1, wherein said filling is conducted with the preexpanded resin beads being compressed and with pressure being applied inside said hollow article.

9. A process as claimed in claim 8, wherein said heating is conducted by supplying heating steam from one of at least two pipes inserted into said hollow article while evacuating said hollow article through the other pipe.

10. A process as claimed in claim 1, wherein said heating is conducted by supplying heating steam from one of at least two pipes inserted into said hollow article while evacuating said hollow article through the other pipe.

* * * * *